(12) United States Patent
Wöhst et al.

(10) Patent No.: US 11,625,216 B2
(45) Date of Patent: Apr. 11, 2023

(54) TECHNIQUES FOR ANALYZING MULTI-TRACK AUDIO FILES

(71) Applicant: Apple Inc., Cupertino, CA (US)

(72) Inventors: Frank Wöhst, Hamburg (DE); Steffen Gehring, Hamburg (DE); Jan-Hinnerk Helms, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 526 days.

(21) Appl. No.: 16/133,529

(22) Filed: Sep. 17, 2018

(65) Prior Publication Data

US 2020/0089465 A1    Mar. 19, 2020

(51) Int. Cl.
| | |
|---|---|
| *G06F 3/16* | (2006.01) |
| *G11B 27/02* | (2006.01) |
| *G11B 27/34* | (2006.01) |
| *G06F 3/0482* | (2013.01) |

(52) U.S. Cl.
CPC .............. *G06F 3/165* (2013.01); *G11B 27/02* (2013.01); *G11B 27/34* (2013.01); *G06F 3/0482* (2013.01)

(58) Field of Classification Search
CPC ........ G06F 3/162; G06F 3/165; G06F 3/0482; G10H 1/0025; G11B 27/02; G11B 27/34
See application file for complete search history.

(56) References Cited

U.S. PATENT DOCUMENTS

| | | | | |
|---|---|---|---|---|
| 9,640,163 B2* | 5/2017 | Fejzo | ...................... | H04S 7/303 |
| 11,178,457 B2* | 11/2021 | Johnsen | ........... | H04N 21/42224 |
| 2008/0027682 A1* | 1/2008 | Herberger | ........... | G06F 11/3409 |
| | | | | 702/186 |
| 2010/0250510 A1* | 9/2010 | Herberger | ............ | G11B 27/034 |
| | | | | 707/705 |
| 2010/0305732 A1* | 12/2010 | Serletic | ................ | G10H 1/0025 |
| | | | | 715/727 |
| 2011/0019841 A1* | 1/2011 | Fujita | ..................... | H04H 60/04 |
| | | | | 381/119 |
| 2012/0311445 A1* | 12/2012 | Cabanilla | ........... | G11B 27/3027 |
| | | | | 715/716 |

(Continued)

FOREIGN PATENT DOCUMENTS

WO    WO-2016138556 A1 *  9/2016  ............. G01R 23/02

OTHER PUBLICATIONS

AVS4YOU—AVS Audio Editor—Editing Individual Channels, Apr. 10, 2017, pp. 1-5 https://onlinehelp.avs4you.com/avs-audio-editor/working/editingindividualchannels.aspx.*

(Continued)

*Primary Examiner* — Scott T Baderman
*Assistant Examiner* — Mario M Velez-Lopez
(74) *Attorney, Agent, or Firm* — Kilpatrick Townsend & Stockton LLP (57) ABSTRACT

Techniques are provided for implementing multi-track audio analysis. In some instances, a plurality of audio tracks are received and combined into a single audio file. A collection of audio file characteristics are extracted from the single audio file. In some examples, the collection of audio file characteristics are associated with of the plurality of audio tracks and the single audio file. Audio characteristic edits are received for revising the collection of audio file characteristics. Metadata associated with each of the plurality of audio tracks and for the single audio file are updated based at least in part on the audio characteristic edits.

20 Claims, 6 Drawing Sheets

(56) References Cited

U.S. PATENT DOCUMENTS

| | | | | |
|---|---|---|---|---|
| 2013/0311512 A1* | 11/2013 | Hodgkinson | ......... | G06F 16/683 |
| | | | | 707/769 |
| 2015/0094835 A1* | 4/2015 | Eronen | ................ | G10H 1/0008 |
| | | | | 700/94 |
| 2016/0125863 A1* | 5/2016 | Henderson | ........... | G11B 27/031 |
| | | | | 700/94 |
| 2016/0308629 A1* | 10/2016 | Kiely | ................... | G11B 27/031 |
| 2017/0124898 A1* | 5/2017 | Shaffer | ................ | G06F 16/635 |
| 2017/0278507 A1* | 9/2017 | Blyumen | ............ | G06F 16/3344 |
| 2018/0267772 A1* | 9/2018 | Lee | .......................... | G10H 1/46 |
| 2019/0261121 A1* | 8/2019 | Vilermo | .................. | H04S 3/008 |
| 2020/0175093 A1* | 6/2020 | Johnson | ................ | G06F 40/109 |

OTHER PUBLICATIONS

PeachPit.com—Final Cut Pro X Advanced Editing: Working with Sound, Oct. 1, 2012, pp. 1-4 https://web.archive.org/web/20121001100710/https://www.peachpit.com/articles/article.aspx?p=1879718&seqNum=4 (Year: 2012).*

* cited by examiner

TECHNIQUES FOR ANALYZING MULTI-TRACK AUDIO FILES

BACKGROUND

In music production, an audio file (e.g., a track) can be recorded, stored, manipulated, and analyzed using various digital audio workstations. Such workstations provide software options for revising the track in different ways. However, when a band records a song, each member may use a separate microphone to record their portion of the song, thus creating multiple different audio tracks for a single song. However, there are various challenges with processing and managing such multi-track recordings.

BRIEF SUMMARY

Embodiments of the present disclosure can provide systems, methods, and computer-readable medium for implementing multi-track audio analysis. In some instances, a plurality of audio tracks are received and combined into a single audio file. A collection of audio file characteristics are extracted from the single audio file. In some examples, the collection of audio file characteristics are associated with of the plurality of audio tracks and the single audio file. Audio characteristic edits are received for revising the collection of audio file characteristics. Metadata associated with each of the plurality of audio tracks and for the single audio file are updated based at least in part on the audio characteristic edits.

In some embodiments, a computer-implemented method is disclosed for analyzing multi-track audio recordings. The method may comprise receiving a plurality of audio tracks recorded together. The method may further comprise receiving, from a user interface, selection of a subset of the plurality of audio tracks for analysis, where the subset of the plurality of audio tracks at least do not including an excluded audio track of the plurality of audio tracks. The method may further comprise combining the subset of the plurality of audio tracks into a single audio file. In some embodiments, the method may further comprise detecting a tempo, a downbeat, and a signature for the single audio file. The method may further comprise storing the tempo, the downbeat, and the signature of at least one of the plurality of audio tracks, including the excluded audio track, and for the single audio file. The method may further comprise receiving, via a user interface, audio characteristic edits for revising at least one of the tempo, the downbeat, or the signature of at least one of the plurality of the plurality of audio tracks. Additionally, the method may also comprise updating the metadata for each of the plurality of audio tracks, including the excluded audio track, and for the single audio file based at least in part on the audio characteristic edits.

In some embodiments, the method may also include tagging each of the plurality of audio tracks with a same identifier. The method may also include associating the tempo, the downbeat, and the signature with the same identifier. In some cases, combining the subset of the plurality audio tracks into the single audio file may comprise summing each track of the subset of the plurality of audio tracks to form the single audio file and normalizing the single audio file. Additionally, in some instances, a default setting may be configured to combine all tracks of the plurality of audio tracks is overridden in accordance with receipt of the selection of the subset of the plurality of audio tracks.

In some embodiments, a system is disclosed for analyzing multi-track audio recordings. The system may comprise one or more memories configured to store computer-executable instructions and one or more processors configured to execute the computer-executable instructions to perform operations. In some embodiments, the operations may configure the system to receive a plurality of audio tracks. The operations may further configure the system to combine the plurality of audio tracks to a single audio file. The operations may further configure the system to extract a collection of audio file characteristics for the single audio file. The operations may further configure the system to associate the collection of audio file characteristics with each of the plurality of audio tracks and for the single audio file. The operations may further configure the system to receive, via a user interface, audio characteristic edits for revising the collection of audio file characteristics for a particular track of the plurality of audio tracks. The operations may also configure the system to update metadata for each of the plurality of audio tracks and for the single audio file based at least in part on the audio characteristic edits.

In some cases, each track of the plurality of audio tracks may be recorded at intervals of a same time. Additionally, the plurality of audio tracks may be combined to a single audio file for each interval as the plurality of audio tracks are received. In some examples, level faders of the single audio file may be reduced to a default level and the default level may comprise zero decibels. In some instances, the operations may also configure the system to exclude at least one track of the plurality of audio tracks from being combined into the single audio file. Additionally, the collection of audio file characteristics may be stored as metadata for the excluded track and the metadata for the excluded track may be updated based at least in part on the audio characteristic edits. Further, the audio file characteristics may comprise at least one of a tempo of the single audio file, a downbeat of the single audio file, or a signature of the single audio file In some embodiments, a computer-readable storage medium is disclosed. The computer-readable storage medium may store computer-executable instructions that, when executed by one or more processors, configure the one or more processors to perform various operations. The operations may comprise xxx. In some embodiments, the operations may comprise receiving a plurality of audio tracks. The operations may further comprise summing the plurality of audio tracks to a single audio file. The operations may further comprise extracting at least one audio file characteristic for the single audio file. The operations may further comprise associating the at least one audio file characteristic with each of the plurality of audio tracks and with the single audio file. The operations may further comprise receiving, via a user interface, audio characteristic edits for revising the at least one audio file characteristic for at least one track of the plurality of audio tracks. The operations may also include updating the association of the at least one audio file characteristic for each of the plurality of audio tracks and for the single audio file based at least in part on the audio characteristic edits.

Additionally, in some examples, the plurality of audio tracks were recorded together and are configured to be played together in an audio playback application. In some instances, the plurality of audio tracks and the single audio file are tagged with a common identifier. Additionally, in some examples, a subset of the plurality of audio tracks are selected as contributing tracks. Further, the single audio file may be generated by summing only the contributing tracks and/or the at least one audio file characteristic may be updated for non-contributing tracks based at least in part on the audio characteristic edits.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The techniques described herein are directed, at least in part, towards techniques for analyzing multi-track audio files. In some cases, a user may record (e.g., using a microphone) some sounds as part of a song. When this is done, the recording is considered an audio (e.g., music) track. The recording could be the person's voice or an instrument. Once recorded, various Digital Audio Workstation (DAW) applications can be used to edit or otherwise manipulate the digital audio track. In other instances, a group of users/instruments may be recorded at the same time (e.g., a band working on a song together). In this case, each user (e.g., with or without an instrument) may have a microphone recording either their voice or their instrument. Each of these audio tracks may be part of a song, and therefore, the package of tracks may be considered a multi-track audio file.

As noted, a multi-track audio file comprises various different audio tracks that are all recorded (e.g., collected by microphones) at the same time. Once collected, the tracks can be combined (e.g., downmixed) into a single file or utilized individually. In some examples, the techniques described herein are configured to enable detection of various audio characteristics of each track and/or the downmixed file. Some examples of detectable audio characteristics include, but are not limited to, tempo, time signature, and downbeat. In some examples, these audio characteristics can be detected in real-time as the tracks are being recorded. Real-time detection of the characteristics can include detection of the characteristics for each interval of time (e.g., each millisecond, second, etc.) as the bits are being received by the processors. In other words, any time other than waiting until the entire recording is complete may be considered real-time; however, optimal real-time processing would be done as the data is received (e.g., in a streaming fashion).

In some cases, each individual track can be tagged with an identifier that is the same for each track of a song. That way, each track is identifiable as being related to the other tracks of the song. Additionally, each track can be downmixed to make a single audio file that includes all of the information from each track. Once generated, this single audio file may be normalized to avoid clipping (e.g., reduced to zero decibels (0 dB)) and then analyzed to detect tempo, time signature, and/or downbeat for the combined (downmixed) audio file. The characteristics detected when analyzing the combined audio file can then be shared with each audio track as data. Thus, each audio track of the song will be tagged such that they are associated with one another, tagged to the downmixed audio file such that they are associated to the combined file, and associated with the audio characteristics that were detected from the combined audio file. While this can be done in real-time while the songs are being recorded, this can also be done after the song has been recorded or on any set of digital audio tracks.

In some cases, the user may then be able to see a visual representation of each track, the downmixed file, and all the corresponding data (e.g., track tags and associated audio characteristic data). The user may choose to make edits to the audio characteristic data (e.g., if the detected audio characteristics do not appear to be correct). For example, if the tempo does not appear to be detected correctly, the user can interact with a user interface to make changes to the tempo data. While this won't directly affect the playback of the song, it will affect the data that corresponds to the audio tracks. These audio characteristic edits can then be populated to the downmixed audio file and to each individual audio track. Thus, any changes made to any one of the audio tracks will affect every track that is the part of the multi-track audio file. In some examples, not all tracks will be selected for contribution to the downmix file and therefore do not contribute to the audio characteristic detection. However, when the audio characteristics are edited, those edits will still be associated with the non-contributing track as long as that track is part of the multi-track audio file (whether recorded with the other tracks or added later).

In an example, a band may get together to record a song. The band may include a singer, a drummer, a lead guitarist, and a bass guitarist. The band plays together, where each member has their own microphone), and a software application is configured to receive each individual audio track as it is recorded (e.g., from each microphone). While receiving the tracks, the application can generate a downmix and detect a tempo. Upon review of the tempo by the users, one user may determine that the tempo is wrong during a thirty second period of the song. This can be revised using a user interface of the software application. Once the tempo is updated, that change can be used to update the tempo of each individual audio track as well as the downmixed file. Once all the audio characteristics have been revised to satisfaction of the users, the individual audio tracks (and/or the downmix file) can be used in various DAW applications.

Figure 1:
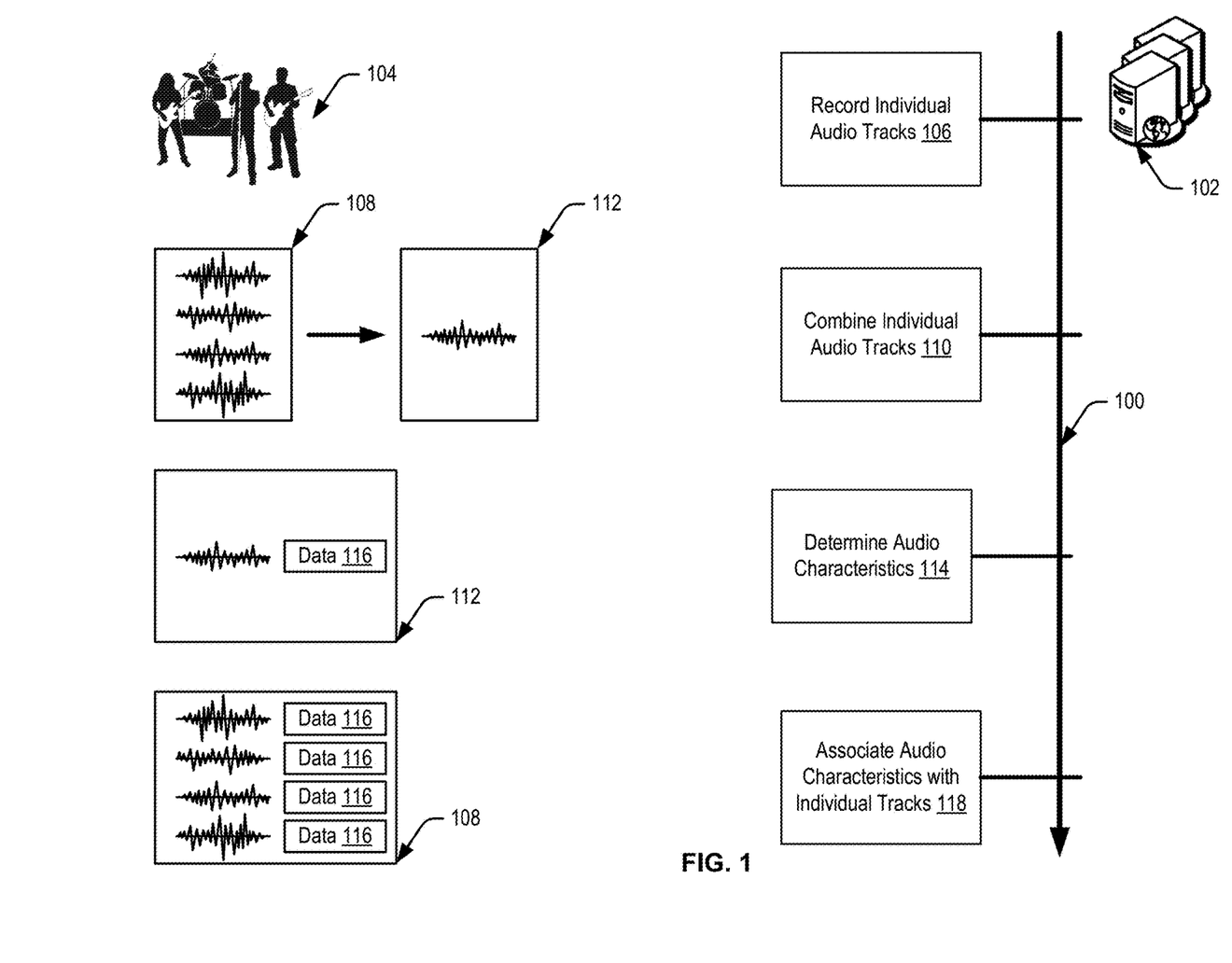
FIG. 1 is an example flowchart for illustrating example techniques for implementing a multi-track audio analysis tool, according to at least one embodiment.

FIG. 1 is a block diagram illustrating an example flow 100 for describing implementation of the multi-track analysis described herein, in accordance with at least one embodiment. In this example, one or more computing devices 102 (e.g., a cloud service provider or a user device, such as but not limited to a personal computer or a handheld device)

may be configured to record individual audio tracks for each member of band 104 at block 106. In some cases, each audio track may be represented by a waveform or other user interface representation that illustrates a time-based representation of each audio track (e.g., waveforms 108). At block 110, the one or more computing devices 102 may be configured to combine the individual tracks into a single audio file (e.g., represented by waveform 112). As noted above, the individual audio tracks may be combined in real-time (e.g., as each time slice of data is received during recording) or as a batch process (e.g., at the end of the recording). The process of combining the tracks at block 110 may be called "downmixing," and the waveform 112 may be called the "downmixed file."

In some examples, the one or more computing devices 102 may additionally determine audio characteristics for the downmixed file 112 at block 114. The audio characteristics may include the tempo, the time signature, the downbeat of the audio file, and/or any other information that be extracted from the audio tracks. These audio characteristics can be stored as a data file 116 and be associated with the downmixed file 112. At block 118, the data file 116 can also be associated with each track of the individual audio tracks corresponding to the waveforms 108.

Figure 2:
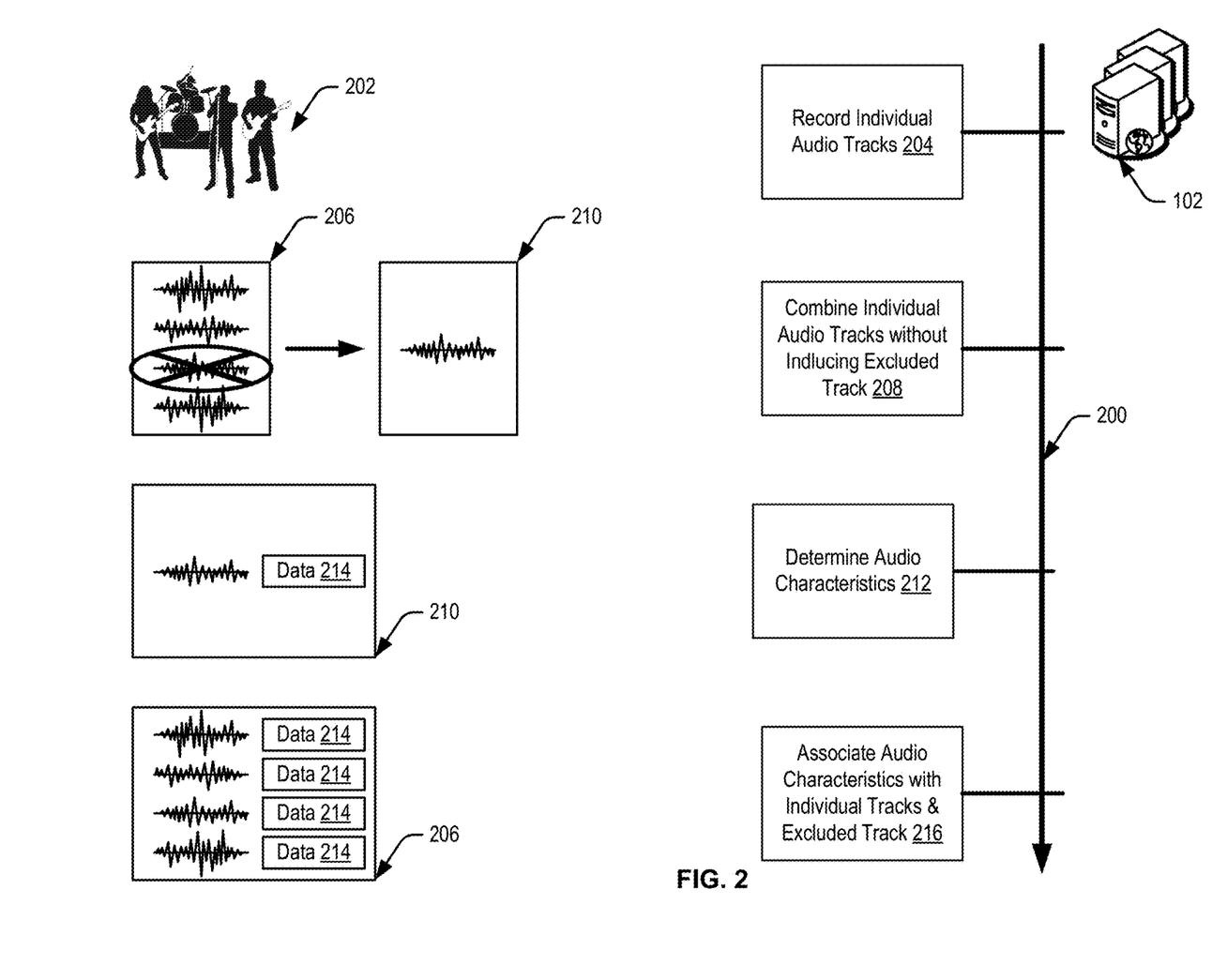
FIG. 2 is another example flowchart for illustrating example techniques for implementing a multi-track audio analysis tool, according to at least one embodiment.

FIG. 2 is another block diagram illustrating an example flow 200 for describing implementation of the multi-track analysis described herein, in accordance with at least one embodiment. In this example, the one or more computing devices 102 (e.g., from FIG. 1) may be configured to record individual audio tracks for each member of band 202 at block 204. In some cases, each audio track may be represented by a waveform or other user interface representation that illustrates a time-based representation of each audio track (e.g., waveforms 206). In this example, a user of the computing devices 102 may select (e.g., using a UI of a software application) one or more of the waveforms for exclusion from the downmixing process. As such, at block 208, the individual audio tracks may be combined without including the excluded audio track to form the downmixed file 210.

In some examples, the downmixed file 210 is, thus, created by combining (e.g., summing and normalizing the included audio tracks) all of the individual audio tracks 206 except for the excluded audio track. Once the downmixed file 210 has been generated, the computing devices 102 can determine one or more audio characteristics at block 212. The audio characteristics can be stored in a data file 214 and associated with the downmixed file 210. At block 216, the audio characteristics can then be associated with the individual audio tracks 206, included the excluded track. In this way, even though the excluded track didn't contribute to the downmixed file 206, it will still be associated with the audio characteristics that were identified based at least in part on the song recording from block 204.

Figure 3:
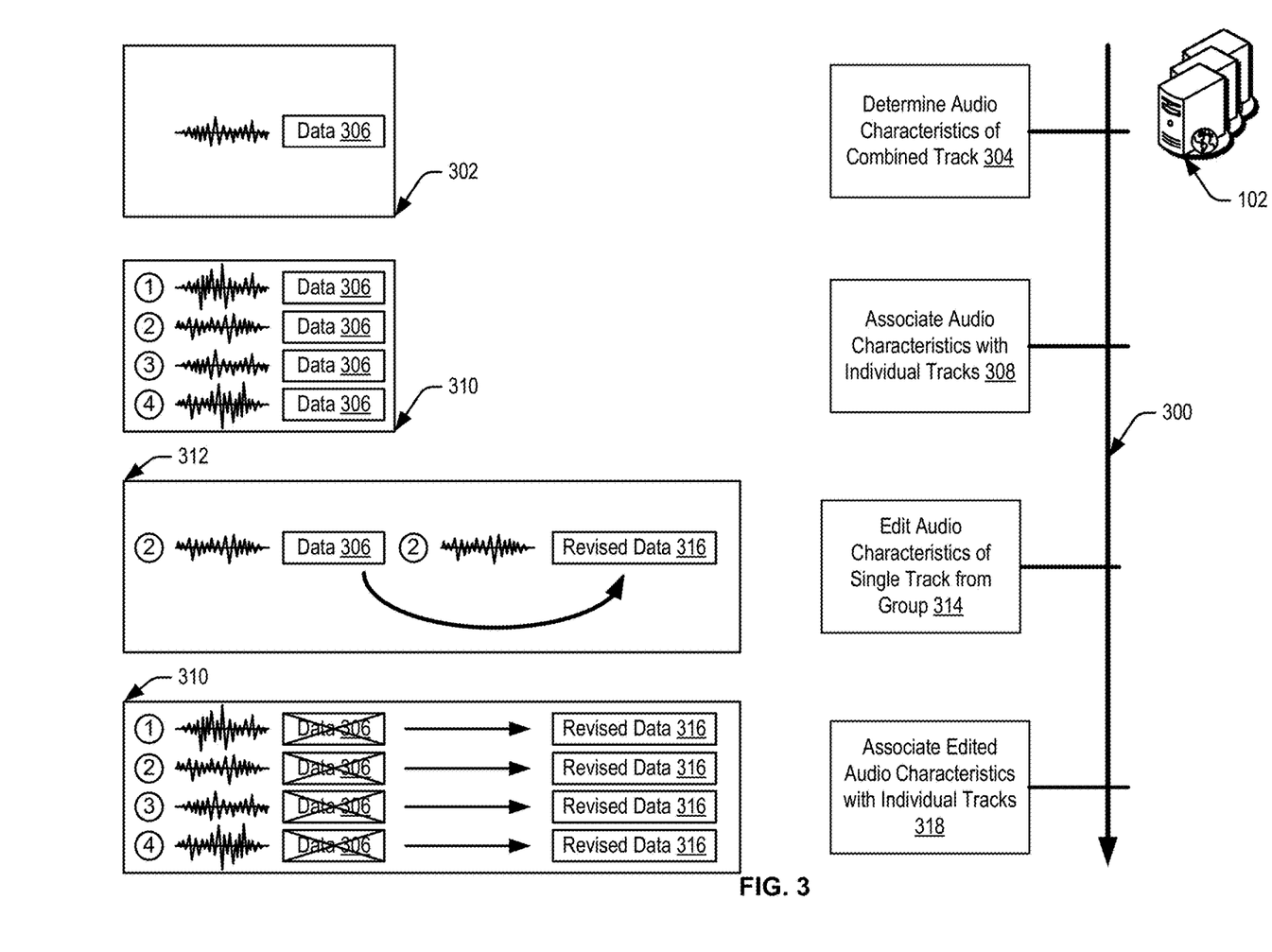
FIG. 3 is another example flowchart for illustrating example techniques for implementing a multi-track audio analysis tool, according to at least one embodiment.

FIG. 3 is another block diagram illustrating an example flow 300 for describing implementation of the multi-track analysis described herein, in accordance with at least one embodiment. In this example, the one or more computing devices 102 (e.g., from FIG. 1) may be configured to determine audio characteristics of a combined (downmixed) track 302 at block 304. The process at block 304 is similar to that of block 114 of FIG. 1 and block 212 of FIG. 2. As such, the audio characteristics information can be stored as a data file 306 and associated with the downmixed file 302. At block 308, the audio characteristics (e.g., data file 306) can also be associated with each individual track (e.g., track 1, track 2, track 3, and track 4) of the set of individual tracks 310 from which the combined track 302 was generated. In some examples, one of the individual audio tracks (e.g., track 2) 312 may be selected by the user. As noted, track 2 has been associated with the audio characteristics data file 306 from block 308.

At block 314, a user may edit the audio characteristics of a single track from the group. In this example, the user may edit the data file 306 associated with track 2. The user may revise the tempo, the downbeat, the time signature, and/or any other audio characteristics that are part of the data file 306. The resulting revised data file 316 is then associated with track 2 once the user is done making edits. At block 318, the method 300 may end by associating the edited audio characteristics (e.g., revised data 316) with each of the individual tracks 310. The original data files 306 may be deleted, overwritten with the revised data file 316, or saved for later (e.g., to allow an undo operation to revert back to the previous settings. In some examples, each of data files 306 and revised data files 316 may be metadata that is stored for each of the audio tracks 310.

A tempo application can be used to provide powerful new tempo analysis and editing capabilities. In some cases, a user can record a performance without the metronome and have the tempo application adapt the project tempo to match the tempo of the recording, or keep the project tempo and flex the recording to match it. The tempo application also makes it easy to create remixes using audio files and MIDI regions with different tempos that all conform to the project tempo, or adapt the project tempo to the tempo of an imported audio file or MIDI region. Unlike audio quantization, which identifies transient peaks in an audio file, the tempo application analysis places beat markers based on the musical tempo detection of an audio file. When used with complex musical material, the tempo application analysis can deliver better results than using audio quantization. Though transients can be edited destructively in an audio file editor, a user can edit the tempo application beat markers and other tempo information in a tempo editor application. The user can also use the tempo application with MIDI regions in a project. MIDI regions always follow the project tempo, and so behave similarly to flexed audio files with the. Because MIDI regions have no source audio file, the tempo application analysis and any edits that are made in the tempo editor can be saved directly to the MIDI regions and stored with the project.

In some examples, a project tempo mode may determine whether the project tempo is maintained, or adapts to the tempo of audio recordings, imported audio files, and MIDI regions. The user can choose the project tempo mode in the UI of the tempo application. The project tempo modes can include:

Keep Project Tempo: Maintains the project tempo when a user records audio or MIDI, or when the user imports audio files.

Adapt Project Tempo: Alters the project tempo to match the tempo of recorded or imported regions. When the user moves or copy regions, the tempo information of the regions moves with them. The user can choose this mode for free recording without the metronome or other tempo reference, or when they want the project tempo to follow region edits.

Automatic: The tempo application (or another application) can choose the appropriate behavior (Keep or Adapt) based on whether or not a musical tempo reference (such as the metronome or another region) is present. When a musical tempo reference is present, the project tempo is maintained. When no musical tempo reference is present, the project tempo adapts to match the tempo of recorded or added material.

When using the tempo application in Adapt mode (or when Auto uses Adapt behavior), the results depend on whether a musical tempo reference is present in the part of the project to which the user is recording or adding a file. A musical tempo reference exists when the metronome is active, when audio, MIDI, or drummer regions are present in the part of the project where the user is working, or when Cycle mode is turned on. In most cases, when the user hears any musical material while recording, a musical tempo reference is present. If the user does not hear any material, no musical tempo reference is present.

When a user makes a recording in an empty project with the metronome off, and with the Project Tempo mode set to Adapt (or Auto), the project tempo adapts to the tempo of the new recording. The Tempo track shows the detected tempo, including any tempo variations, which appear as red lines (or the like) in the new region during recording. After recording, the user can turn on the metronome and hear how closely it follows the tempo of the recording. When the user makes additional audio recording, they conform to the project tempo. When the user adds audio files to the project, they can also conform to the project tempo.

When creating a remix, the users often work by combining files recorded at different tempos, and that may contain tempo changes. With the project tempo mode set to Keep, imported files do not affect the project tempo. Imported audio files conform to the project tempo, as long as they are not set to Off. Beat markers are additionally used to conform them at the bar or beat level. The audio regions from the files can be transposed as needed so they play back in the same key.

In some examples, a user can use the tempo application with existing projects, including projects created in earlier versions of the application. For most projects, the multitrack workflow described above is recommended, because it allows the user to define which audio files contribute to the tempo analysis, and allows the analysis results to be shared between all audio files. In cases where the user does not want the tempo analysis results to be shared across audio files, and in which the project contains a single region having a clearly audible and consistent rhythmic pattern throughout (e.g., a stereo recording of the overhead mics of a drum kit), a different workflow can be used.

In some examples, the tempo editor can be used to view and edit audio characteristics analysis results including beat markers and other tempo information. After an audio sample (e.g., track) or MIDI region is recorded or downloaded, the tempo analysis can be refined and/or any tempo detection errors can be corrected. This can be done to define the musical intent more accurately. In some examples, tempo and time signature changes can be transferred to the project tempo and time signature tracks. In some instances, when a tempo editor is opened, the audio file or MIDI region can be displayed along with the tempo analysis results (e.g., similar to 108 of FIG. 1). The entire audio file or MIDI region can be shown in the overview, with the visible area of the file highlighted by a colored rectangle (or the like). The main display can show the visible part of the file, with the detected beats indicated by orange beat markers (or similar UI elements). Beat markers for downbeats can be displayed more prominently than for other beats in some examples.

The user can preview the file or region; make quick tempo, beat, and timing adjustments; or make more complex edits to the tempo information for a single beat, a selection, or the entire file or region. The tempo analysis, and any edits that are made in the tempo editor, are stored in the audio file, so they can still be accessed the user wants a copy the file or to use it in another project. For MIDI regions, the analysis and edits can be stored with the project. The user can make adjustments in two different ways: by playing the file or selection and tapping the D and T keys on a computer keyboard to indicate downbeats (D) and beats (T), or by editing beat markers in the main display. When tapping in a selection, only the downbeats or beats in the selected area are changed in some embodiments.

Each beat marker has several handles, each with a different function. Holding the pointer over a handle displays a tag showing that handle's function. The user can make a selection before clicking a handle; if there is no selection, the application makes a default selection of the beats affected by the edit. Depending on the selection, not all editing functions may be available. The user can view any of the audio files in a multitrack set, including the downmix, in the tempo editor. Edits to the tempo analysis results of downmix are applied to all audio files in the multitrack set.

In some examples, a user can use the tempo analysis tools with multitrack audio recordings, both with recordings made in the tempo application and when the user adds a set of multitrack audio files to a project. For multitrack audio recordings, the tempo application analyzes the multitrack audio files together and applies the analysis results to all of them. By default, all the multitrack audio files contribute to the analysis, but the user can exclude audio files from the analysis while still having the analysis results applied to them. In some instances, the downmix is created from the multitrack audio files that have been selected for contribution. tempo analysis results for the downmix are applied to all files in the tempo multitrack set. The tempo analysis for the downmix can be viewed and edited in the tempo editor application, and the edits can be applied to all files in the multitrack set.

Figure 4:
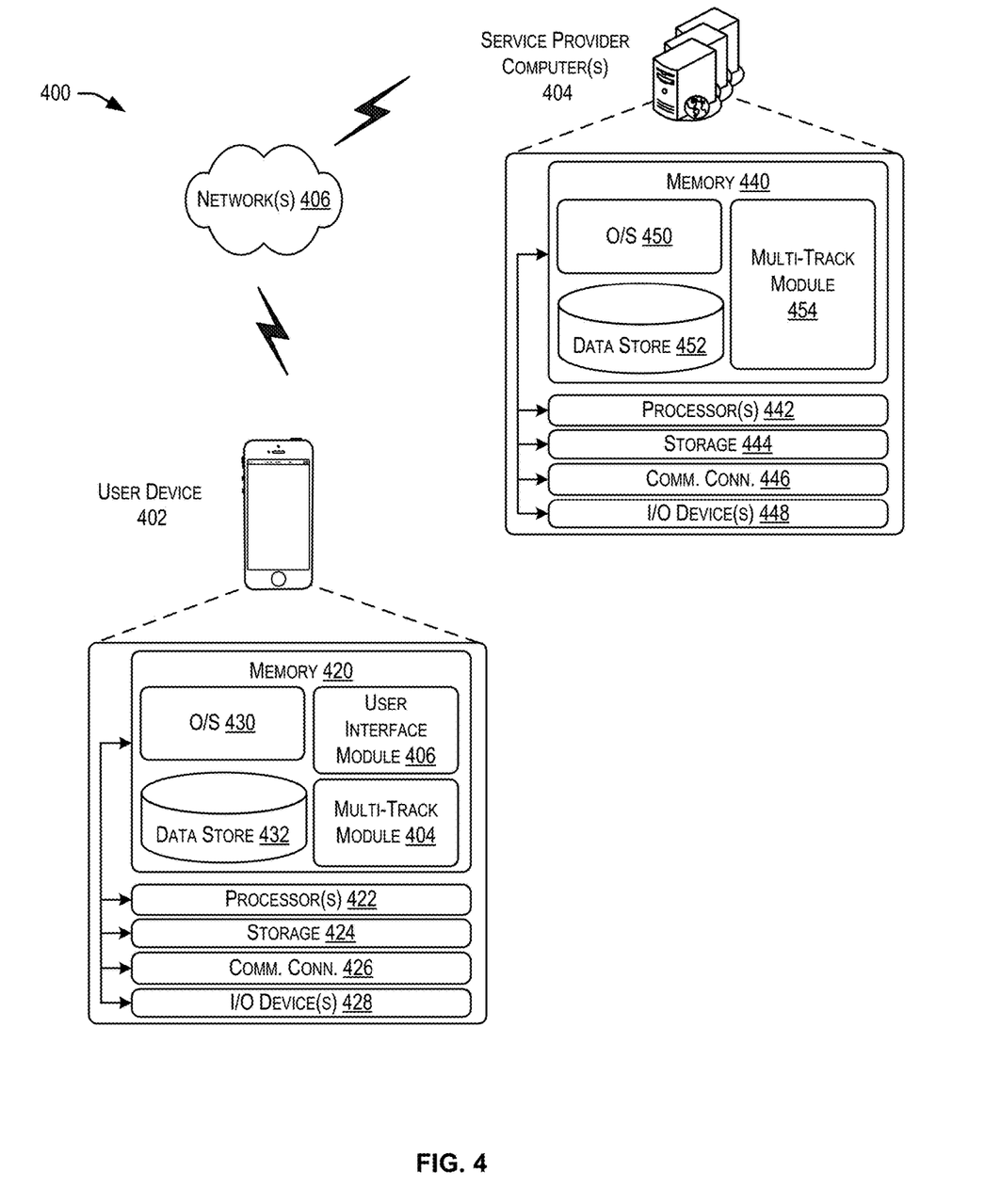
FIG. 4 is an example block diagram for illustrating a system for implementing the techniques described herein, according to at least one embodiment.

FIG. 4 illustrates components of an multi-track tempo analyzing system 400 according to at least one embodiments. System 400 may include user device 402 and/or service provider computer(s) 404 that may communicate with one another via network(s) 406 utilizing any suitable communications protocol. The user device 402 can be any type of computing device accessible to a user, including a personal computer, a smart phone, a tablet, or the like.

In some examples, the network(s) 406 may include any one or a combination of many different types of networks, such as cable networks, the Internet, wireless networks, cellular networks, and other private and/or public networks. While the illustrated example represents the user device 402 communicating with the service provider computer(s) 404 over the network(s) 406, the described techniques may equally apply in instances where the user device 402 interacts with the service provider computer(s) 404 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, a multi-track module 408, discussed further below in more detail, may operate in whole or in part on the user device 402. In some embodiments, the multi-track module 404 may operate in whole or in part as part of the tempo application described above. Thus, in some embodiments, the user device 402 may access the functionality of the image processing engine 408 through components of the service provider computers 404 via user interfaces and/or APIs provided by the service provider computers 404.

As noted above, the user device 402 may be configured to execute or otherwise manage applications or instructions for presenting a user interface (e.g., via user interface module 406). The user device 402 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like.

In one illustrative configuration, the user device 402 may include at least one memory 420 and one or more processing units (or processor(s)) 422. The processor(s) 422 may be implemented as appropriate in hardware, computer-executable instructions, or combinations thereof. Computer-executable instruction or firmware implementations of the processor(s) 422 may include computer-executable or machine-executable instructions written in any suitable programming language to perform the various functions described.

The memory 420 may store program instructions that are loadable and executable on the processor(s) 422, as well as data generated during the execution of these programs. Depending on the configuration and type of the user device 402, the memory 420 may be volatile (such as random access memory (RAM)) and/or non-volatile (such as read-only memory (ROM), flash memory, etc.). The user device 402 may also include additional removable storage and/or non-removable storage 424 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 420 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 420 and the additional storage 424, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 420 and the additional storage 424 are both examples of non-transitory computer storage media. Additional types of computer storage media that may be present in the user device 402 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 402. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The user device 402 may also contain communications connection(s) 426 that allow the user device 402 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. The user device 402 may also include I/O Device(s) 428, such as a touch input device, an image capture device, a keyboard, a mouse, a pen, a voice input device, a display, a speaker, a printer, etc.

Turning to the contents of the memory 420 in more detail, the memory 420 may include an operating system 430 and/or one or more application programs or services for implementing the features disclosed herein. The memory 420 may include data store 432 which may be configured to store image data and/or one or more models corresponding to one or more virtual lighting modes. The memory 420 may include the user interface module 406 and the multi-track module 404.

In some examples, the multi-track module 404 can be configured to implement the features described above and/or interact with a service provider to implement these features (e.g., if the application is run in the cloud, or otherwise available as a service). In some cases, the user interface module 406 may provide the appropriate UI elements needed to implement the features described herein (including, but no limited to, providing the user with access to the multi-track module 404. In some examples, the multi-track module 404 may be configured to receive a plurality of audio tracks, combine the plurality of audio tracks to a single audio file, extract a collection of audio file characteristics for the single audio file, associate the collection of audio file characteristics with each of the plurality of audio tracks and for the single audio file, receive, via a user interface, audio characteristic edits for revising the collection of audio file characteristics for a particular track of the plurality of audio tracks, and update metadata for each of the plurality of audio tracks and for the single audio file based at least in part on the audio characteristic edits. Additionally, in some examples, each track of the plurality of audio tracks may be recorded at intervals of a same time, the plurality of audio tracks may be combined to a single audio file for each interval as the plurality of audio tracks are received, level faders of the single audio file may be reduced to a default level (e.g., 0 dB), and/or the audio file characteristics may comprise at least one of a tempo of the single audio file, a downbeat of the single audio file, or a signature of the single audio file. Further, the multi-track module 404 may also be configured to exclude at least one track of the plurality of audio tracks from being combined into the single audio file, where the collection of audio file characteristics may be stored as metadata for the excluded track and/or the metadata for the excluded track may be updated based at least in part on the audio characteristic edits.

In some aspects, the service provider computer(s) 404 may be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 404 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 404 may be in communication with the user device 402 via the network(s) 406. The service provider computer(s) 404 may include one or more servers, perhaps arranged in a cluster, as a set of servers, or as individual servers not associated with one another. These servers may be configured to implement the functionality described herein as part of an integrated, distributed computing environment.

In one illustrative configuration, the service provider computer(s) 404 may include at least one memory 440 and one or more processing units (or processor(s)) 442. The processor(s) 442 may be implemented as appropriate in hardware, computer-executable instructions, firmware, or combinations thereof. Computer-executable instruction or firmware implementations of the processor(s) 442 may include computer-executable or machine-executable instructions written in any suitable programming language to perform the various functions described.

The memory 440 may store program instructions that are loadable and executable on the processor(s) 442, as well as data generated during the execution of these programs. Depending on the configuration and type of service provider computer(s) 404, the memory 440 may be volatile (such as RAM) and/or non-volatile (such as ROM, flash memory, etc.). The service provider computer(s) 404 or servers may also include additional storage 444, which may include removable storage and/or non-removable storage. The additional storage 444 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 440 may include multiple different types of memory, such as SRAM, DRAM, or ROM.

The memory 440, the additional storage 444, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 440 and the additional storage 444 are all examples of computer storage media. Additional types of computer storage media that may be present in the service provider computer(s) 404 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 404. Combinations of any of the above should also be included within the scope of computer-readable media.

The service provider computer(s) 404 may also contain communications connection(s) 446 that allow the service provider computer(s) 404 to communicate with a stored database, another computing device (e.g., the user device 402) or server, user terminals and/or other devices on the network(s) 406. The service provider computer(s) 404 may also include I/O device(s) 448, such as a keyboard, a mouse, a pen, a voice input device, a touch input device, a display, speakers, a printer, etc.

Turning to the contents of the memory 440 in more detail, the memory 440 may include an operating system 450, one or more data stores 452, and/or one or more application programs, modules, or services for implementing the features disclosed herein, such as the multi-track module 454.

In at least one embodiment, the multi-track module 454 may be configured to store any results from the multi-track module 404 of the user device 402. However, in other examples, the multi-track module 454 may be configured to perform all of the needed steps to implement the multi-track analysis described above (e.g., at least the operations described as being performed by the multi-track module 404), but as a web service. In this case, user requests at the user interface module 406 may sent to the multi-track module 454, the multi-track module 454 may perform the processing of the tempo application and/or tempo editor application described above, and then provide the results back to the multi-track module 404 and/or the user interface module 406 for display to the user.

Figure 5:
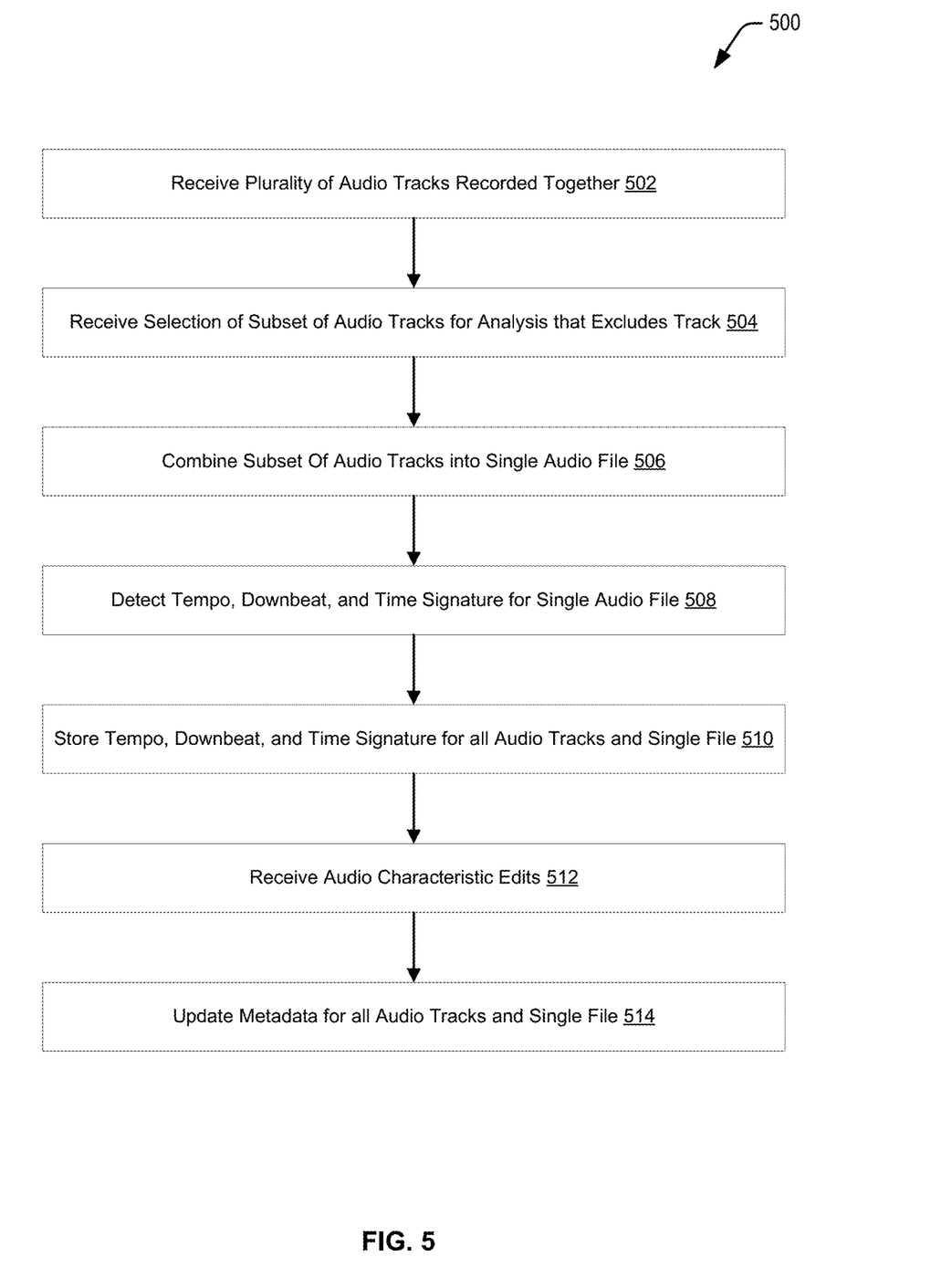
FIG. 5 is another example flowchart for illustrating example techniques for implementing a multi-track audio analysis tool, according to at least one embodiment.
Figure 6:
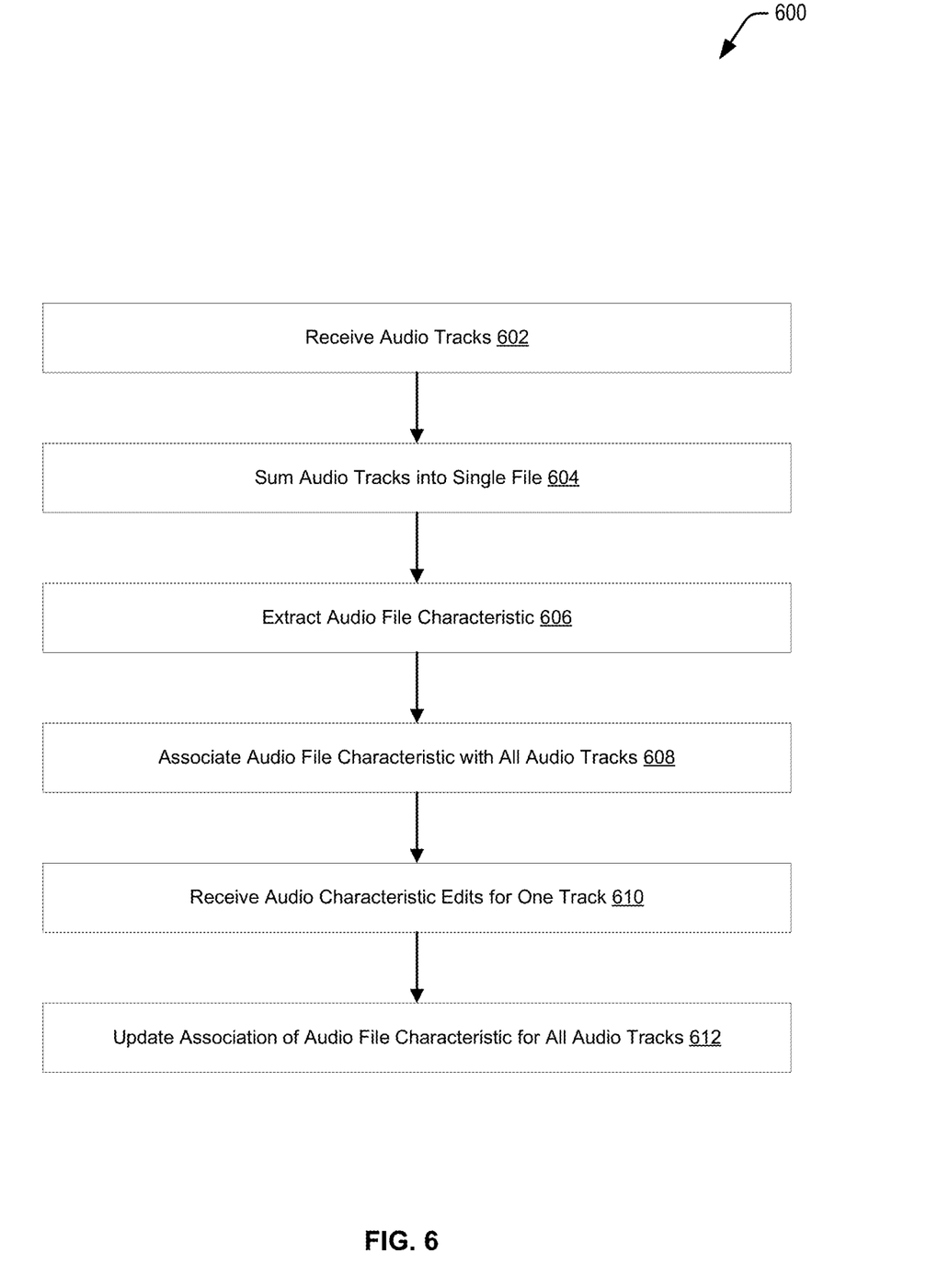
FIG. 6 is another example flowchart for illustrating example techniques for implementing a multi-track audio analysis tool, according to at least one embodiment.

FIGS. 5 and 6 are flowcharts illustrating example methods (processes) 500 and 600 for performing the techniques described herein. Some or all of the methods 500 and 600 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The methods 500 and 600 may be performed by one or more, or a combination, of the multi-track module 404, the user interface module 406, and/or the multi-track module 454 of FIG. 4.

FIG. 5 can begin at block 502, where a plurality of audio tracks recorded together may be received. The audio tracks may be received after the recording is complete, or during recording (e.g., in real-time while a song is being played by members of a band). In some instances, the audio tracks may be recorded while the method 500 is being executed. At block 504, a selection of a subset of the audio tracks may be received for analysis. One or more tracks may be excluded from the analysis. The selection of tracks to exclude may be received via a user interface. Each audio track selected may be considered a contributing song to a downmixing process that combines the contributing tracks into a single audio file. At block 506, the method 500 may combine the selected subset of audio tracks (e.g., the contributing tracks) into a single file (downmixing). At block 508, one or more audio characteristics (e.g., tempo, time signature, and/or a downbeat) may be detected, identified, or otherwise extracted from the single file.

At block 510, the audio characteristics may be stored for (e.g., associated with) all the audio tracks and the single file. In this way, each audio track may include metadata that identifies the extracted audio characteristics for the single file. In some examples (e.g., when the audio tracks are being received and processed as they are received (e.g., in real-time)), blocks 502, 504, 506, 508, and 510 may be executed during the recording of the audio tracks. However, in other examples, only a subset (e.g., not all) of these blocks are performed in real time. At block 512, audio characteristic edits may be received (e.g., via the user interface noted above). Audio characteristic edits may include changes to the tempo, downbeat, or time signature. From the perspective of a music producer, these edits may be desired in order to correct mistakes made by the method 500 in analyzing such audio characteristics (e.g., if the tempo, downbeat, or signature were inaccurately determined). The method (process) 500 may end at block 514, where the metadata associated (e.g., stored) with each audio track and the single file is updated to take into account the changes made to the audio characteristics. In this way, if an audio characteristic is revised while a user is reviewing a single track, those changes will be populated to the other tracks of the song.

FIG. 6 can begin at block 602, where a plurality of audio tracks recorded together may be received. The audio tracks may be received after the recording is complete, or during recording (e.g., in real-time while a song is being played by members of a band). In some instances, the audio tracks may be recorded while the method 600 is being executed. At block 604, the audio tracks (or a subset of the audio tracks) can be summed together to form a single audio file. The single audio file may include each part of the received audio tracks combined together (e.g., to form a song). At block 606, one or more audio characteristics (e.g., tempo, time signature, and/or a downbeat) may be detected, identified, or otherwise extracted from the single file. At block 608, the audio characteristics may be associated with all the audio tracks and, in some examples, with the single file. In this way, each audio track may include metadata that identifies the extracted audio characteristics for the single file. At block 610, audio characteristic edits may be received (e.g., via the user interface noted above). Audio characteristic edits may include changes to the tempo, downbeat, or time signature. As noted above, these edits may be desired in order to correct mistakes made by the method 600 in analyzing such audio characteristics (e.g., if the tempo, downbeat, or signature were inaccurately determined). The method (process) 600 may end at block 612, where the metadata associated (e.g., stored) with each audio track and the single file is updated to take into account the changes made to the audio characteristics. In this way, if an audio characteristic is revised while a user is reviewing a single track, those changes will be populated to the other tracks of the song.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   incrementally receiving respective portions of a plurality of audio tracks during a recording, each of the plurality of audio tracks being recorded together and corresponding to a respective audio source;
   receiving, from a user interface, selection of a subset of the plurality of audio tracks for analysis, the subset of the plurality of audio tracks not including an excluded audio track of the plurality of audio tracks;
   during the recording of the plurality of audio tracks:
      combining received portions of the subset of the plurality of audio tracks into a single audio file, the excluded audio track being excluded from being combined with the subset of the plurality of audio tracks into the single audio file based at least in part on the selection;
      detecting, from the single audio file, audio characteristics comprising one or more of: a tempo, a downbeat, and a time signature; and
      storing the audio characteristics detected for the single audio file as metadata for each of the plurality of audio tracks, including the excluded audio track, and for the single audio file;
   receiving, via a user interface, audio characteristic edits for revising at least one of the tempo, the downbeat, or the time signature of at least one of the plurality of audio tracks; and
   updating the metadata for each of the plurality of audio tracks, including corresponding metadata of the excluded audio track, and for the single audio file based at least in part on the audio characteristic edits.

2. The computer-implemented method of claim 1, further comprising tagging each of the plurality of audio tracks with a same identifier.

3. The computer-implemented method of claim 2, further comprising associating the tempo, the downbeat, and the time signature with the same identifier.

4. The computer-implemented method of claim 1, wherein combining the subset of the plurality of audio tracks into the single audio file comprises:

summing each track of the subset of the plurality of audio tracks to form the single audio file; and
normalizing the single audio file.

5. The computer-implemented method of claim 1, wherein a default setting configured to combine all tracks of the plurality of audio tracks is overridden in accordance with receipt of the selection of the subset of the plurality of audio tracks.

6. A computer system, comprising:
one or more processors; and
one or more storage devices configured to store computer-executable instructions that, when executed by the one or more processors, configure the computer system to at least:
receive respective portions of a plurality of audio tracks during a recording, each of the plurality of audio tracks being recorded together and corresponding to a respective audio source;
receive, from a user interface, selection of a subset of the plurality of audio tracks for analysis, the subset of the plurality of audio tracks excluding an excluded audio track of the plurality of audio tracks;
during the recording of the plurality of audio tracks:
combine received portions of the subset of the plurality of audio tracks to a single audio file, the excluded audio track being excluded from being combined with the subset of the plurality of audio tracks into the single audio file based at least in part on the selection;
extract a collection of audio file characteristics for the single audio file;
associate the collection of audio file characteristics with each of the plurality of audio tracks, including the excluded audio track, and for the single audio file;
receive, via a user interface, audio characteristic edits for revising the collection of audio file characteristics for a particular track of the plurality of audio tracks; and
update metadata for each of the plurality of audio tracks, including corresponding metadata for the excluded audio track, and for the single audio file based at least in part on the audio characteristic edits.

7. The computer system of claim 6, wherein level faders of the single audio file are reduced to a default level.

8. The computer system of claim 7, wherein the default level comprises zero decibels.

9. The computer system of claim 6, wherein the collection of audio file characteristics comprises at least one of: a tempo of the single audio file, a downbeat of the single audio file, or a time signature of the single audio file.

10. The computer system of claim 6, wherein the collection of audio file characteristics comprises a tempo detected from the single audio file, and wherein executing the computer-executable instructions by the one or more processors further configures the computer system to:
import a subsequent audio file to be combined with the single audio file generated from combining the received portions of the subset of the plurality of audio tracks; and
modify corresponding audio file characteristics of the subsequent audio file to conform to the tempo detected from the single audio file during the recording of the plurality of audio tracks.

11. The computer system of claim 10, wherein modifying the corresponding audio file characteristics of the subsequent audio file that was imported is based at least in part on identifying, by the computer system, that a musical tempo reference is associated with the plurality of audio tracks.

12. The computer system of claim 6, wherein the collection of audio file characteristics comprises a tempo detected from the single audio file, and wherein executing the computer-executable instructions by the one or more processors further configures the computer system to:
receive a subsequent portion of the recording of the plurality of audio tracks; and
modify a corresponding tempo of the subsequent portion of the recording to conform to the tempo detected from the single audio file generated from combining the received portions of the subset of the plurality of audio tracks.

13. The computer system of claim 6, wherein the received portions of the plurality of audio tracks that are combined into the single audio file are each associated with an interval of time that corresponds to a particular portion of the recording.

14. The computer system of claim 6, wherein executing the computer-executable instructions by the one or more processors further configures the computer system to tag each of the plurality of audio tracks with an association to an identifier of the single audio file.

15. A computer-readable storage medium having stored thereon computer-executable instructions that, when executed by one or more processors, cause the one or more processors to perform operations comprising:
receiving respective portions of a plurality of audio tracks during a recording, each of the plurality of audio tracks being recorded together and corresponding to a respective audio source;
receiving, from a user interface, selection of a subset of the plurality of audio tracks for analysis, the subset of the plurality of audio tracks excluded an excluded audio track of the plurality of audio tracks;
during the recording of the plurality of audio tracks:
combining received portions of the subset of the plurality of audio tracks into a single audio file, the excluded audio track being excluded from being combined with the subset of the plurality of audio tracks into the single audio file based at least in part on the selection;
extracting at least one audio file characteristic for the single audio file; and
associating the at least one audio file characteristic with each of the plurality of audio tracks, including the excluded audio track, and with the single audio file;
receiving, via a user interface, audio characteristic edits for revising the at least one audio file characteristic for at least one track of the plurality of audio tracks; and
updating the association of the at least one audio file characteristic for each of the plurality of audio tracks, including a corresponding association of the at least one audio file characteristic to the excluded audio track, and for the single audio file based at least in part on the audio characteristic edits.

16. The computer-readable storage medium of claim 15, wherein the plurality of audio tracks are configured to be played together in an audio playback application.

17. The computer-readable storage medium of claim 15, wherein the plurality of audio tracks and the single audio file are tagged with a common identifier.

18. The computer-readable storage medium of claim 15, wherein the subset of the plurality of audio tracks are selected as contributing tracks.

19. The computer-readable storage medium of claim 18, wherein the single audio file is generated by summing only the contributing tracks.

20. The computer-readable storage medium of claim 18, wherein the at least one audio file characteristic is updated for non-contributing tracks based at least in part on the audio characteristic edits.

* * * * *